July 7, 1970  S. E. FOUNTAIN, JR  3,518,913
MACHINE FOR MAKING BUILDING PANELS
Filed Oct. 16, 1967  3 Sheets-Sheet 3

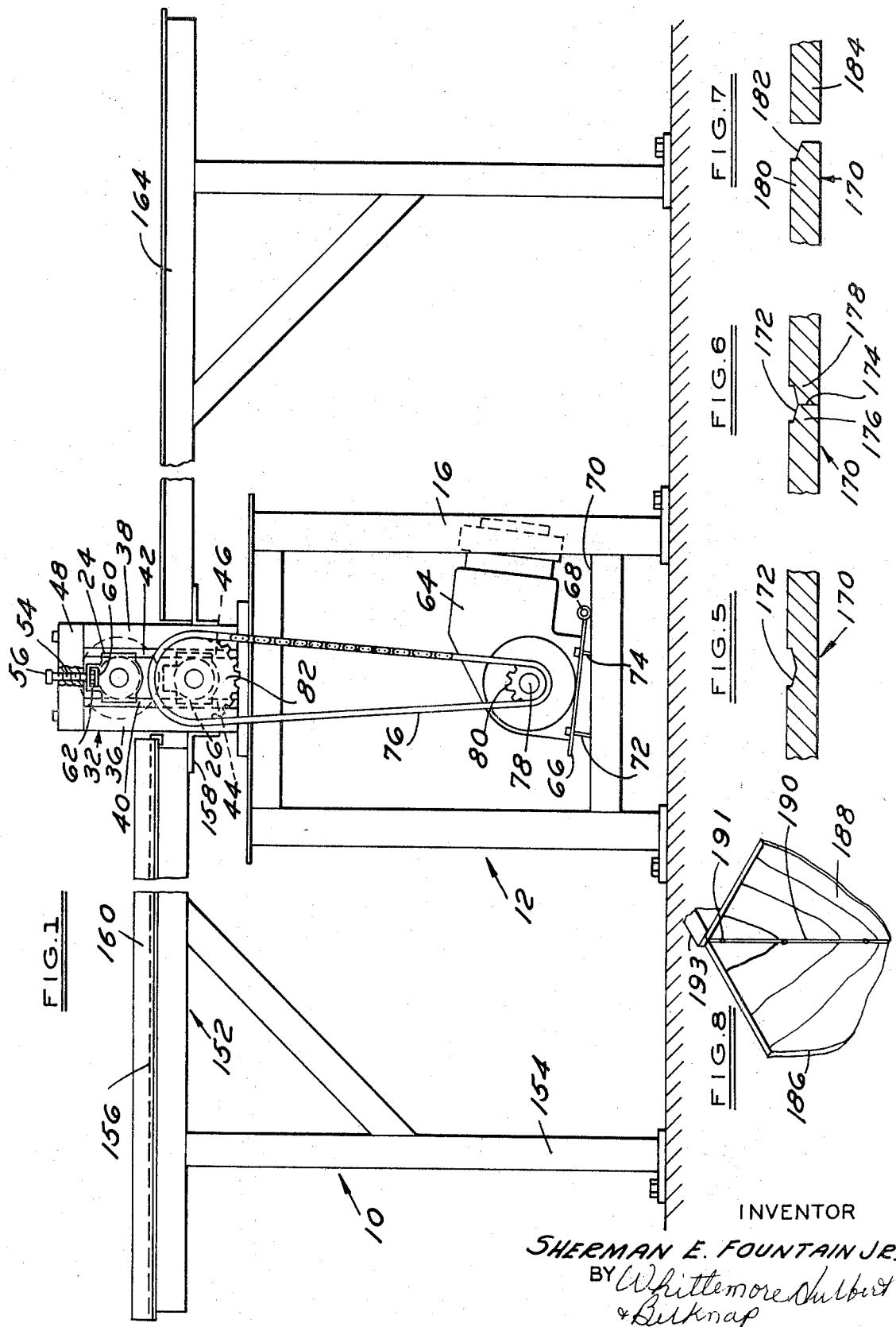

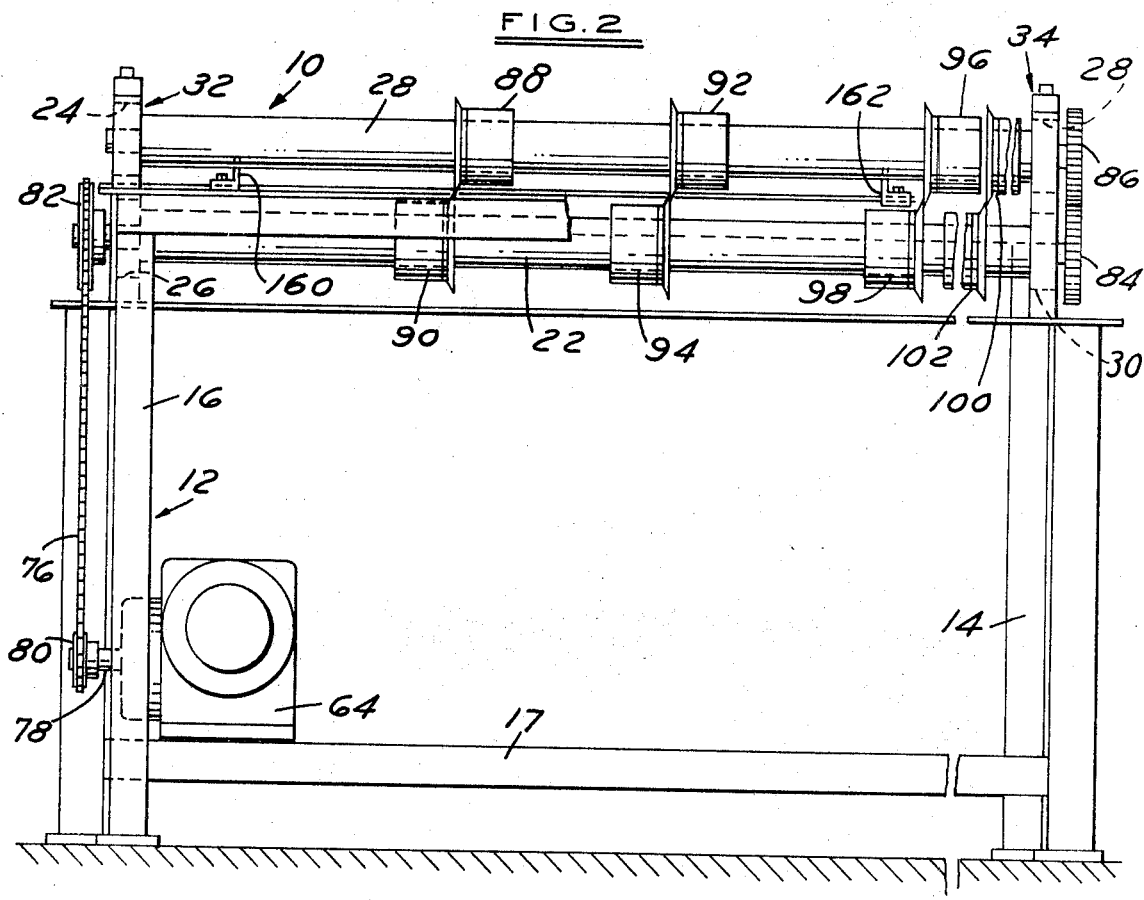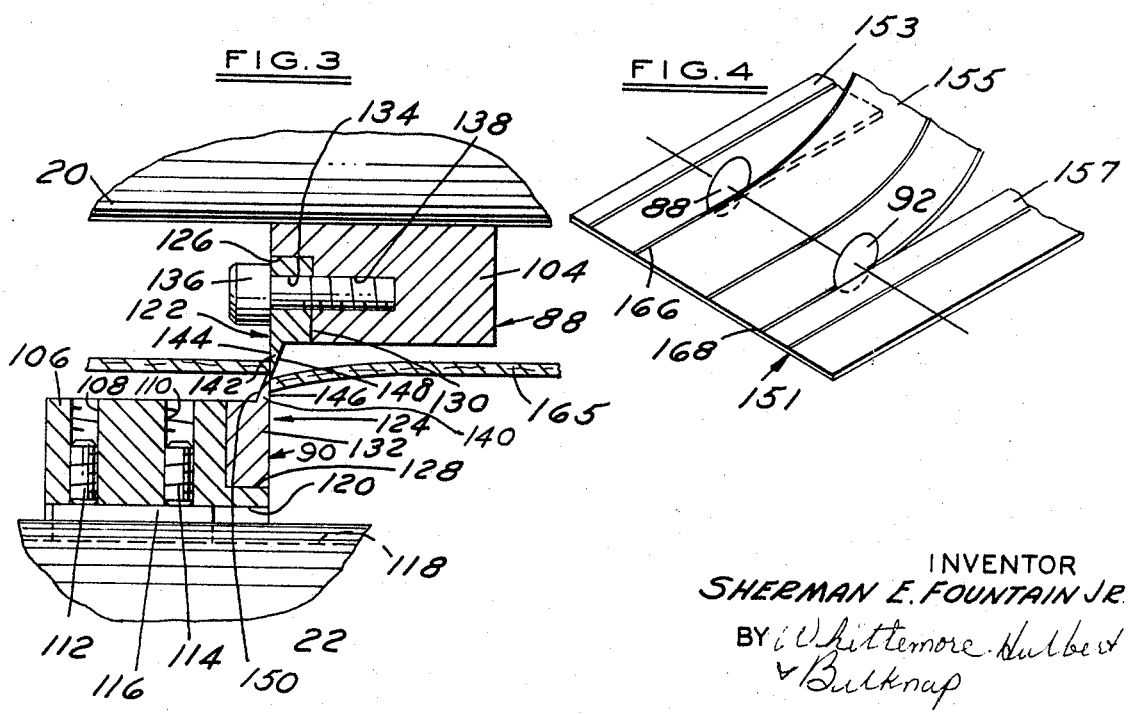

INVENTOR
SHERMAN E. FOUNTAIN JR.

BY Whittemore Hulbert
& Belknap  ATTORNEY

United States Patent Office 3,518,913
Patented July 7, 1970

3,518,913
MACHINE FOR MAKING BUILDING PANELS
Sherman E. Fountain, Jr., Marlette, Mich., assignor to Marlette Homes, Inc., Marlette, Mich., a corporation of Michigan
Filed Oct. 16, 1967, Ser. No. 675,448
Int. Cl. B23d 19/06
U.S. Cl. 83—449       5 Claims

ABSTRACT OF THE DISCLOSURE

A machine is provided for cutting composite panels, such as plywood, high pressure laminates and compressed hard board. The panels may be of substantial thickness, for example, ¼" thick. The machine comprises a pair of shafts which are arranged horizontally, one above the other. A motor is provided to rotate the shafts. Each shaft has at least one circular cutting knife. The knives on the shafts are oppositely disposed and have overlapping cutting edges. A platform is provided adjacent the shafts for feeding a panel between the cutting knives. The platform has guide means for sliding contact with the panel edges to direct the panel between the shafts for cutting by the knives.

---

The method of cutting panels is particularly applicable to plywood of the finished type used for wall paneling. Such plywood has vertical grooves which are spaced apart the same distance as the standard studs in a wall structure. The panels may be slit or cut along the center of a groove by the method of the present invention without eliminating any material of the plywood as would be the case if a saw were used. The portion of the groove remaining on the edges of the severed panel permits abutment of the panel segments against other panel segments to result in a juncture having a complete groove.

The panels are used to form a wall construction comprising a plurality of vertical support studs each of which is spaced a uniform distance from an adjacent stud. A plurality of the plywood panels are secured to the studs and cover the area defined by the studs. The panels have, as above mentioned, vertical grooves spaced apart the same distance as the studs. Vertically spaced fastening means, such as nails, are driven through the plywood grooves and engage the studs to secure the panels in place. The panels are provided in increments of 1, 2 or 3 times the distance between a pair of studs. The outer edges of each panel comprise material defining substantially a one-half groove which is in abutment with an adjacent panel to define a full groove in vertical alignment with a stud.

BACKGROUND OF THE INVENTION

Plywood has come into widespread use as a material for paneling walls. Walls conventionally comprise a plurality of wooden vertical support studs which were spaced apart a uniform distance, normally sixteen inches. Plywood is conventionally provided from the mills in forty-eight inch widths. Plywood panels have grooves on the exterior surfaces thereof. The grooves are in alignment with the studs. The grooves are spaced at sixteen inch increments on the surface of the plywood. The grooves are usually of an off-color and are adapted to receive the nails or brads which secure the plywood to the studs. The nails are recessed into the groove and are blended into the entire wall structure.

The outer side edges of a panel, as it comes from the mill, is provided with material forming one-half of a groove so that when two panels are abutted together on a wall a complete groove will be formed by the abutment. It is frequently desired to use less than a full panel. It may be necessary to use a thirty-two inch segment or a sixteen inch segment. In the past, such segments have been cut from a panel of forty-eight inches. The panel is sawed along one of the grooves which, of course, results in a saw kerf which destroys a portion of the plywood panel. In order to provide the desired one-half groove portion along the edge of the panel to be used, it is necessary to displace the saw cutaway from the center of the groove thus eliminating the portion of the groove adjacent thereto. The section of the panel from which the groove has been eliminated is not useful in paneling a wall and is normally discarded as waste material.

The conventional methods for cutting plywood are uneconomical in that a section of the groove of the cut panel becomes waste material. In addition to this, the disposal of the sawdust created by sawing is a problem, especially in high production manufacturing operations such as the mobile home field, where large amounts of sawdust are created. A further disadvantage of this method is the high expense of the saw blades. Large amounts of adhesive material are used in the manufacture of plywood. The adhesive material causes rapid deterioration of saw blades requiring frequent sharpening of the blades. In addition to the cutting of plywood, the cutting of high pressure laminates of the type, for example, used in forming sink top counters, also presents problems. Such materials cause rapid dulling of saw blades and frequently chip, resulting in a rough edge.

The present invention solves this problem by providing a mechanism which slits the panel material. The slitting operation does not remove any material from the panel. As a consequence, in the case of plywood, the material may be cut along a groove center leaving a one-half groove portion on each segment thus permitting use of both segments in paneling a wall. There is no sawdust created and thus there is no problem of sawdust disposal. Further, the devices used in the slitting operation do not readily become dull and, in fact, appear to be automatically sharpened in the process of slitting. No chips are formed when high pressure laminates are cut. Extreme accuracy is obtainable because the total dimensions of the panel are not altered. Additionally, conventional saw blades tend to waver from side to side in use, thus resulting in an imperfect edge. This does not occur with the method of the present invention.

Another advantage of the invention is that it permits design of a wall construction which eliminates the waste encountered in previous designs. Wall constructions usually have apertures therein as, for example, window openings, ventilation openings and the like. Conventionally plywood panels of forty-eight inch width have been used to form such walls. Panel segments such as sixteen inch segments or thirty-two inch segments have seldom been used because of the waste involved in cutting the forty-eight inch panel. A wall designed in accordance with the present inventioin permits use of sixteen inch, thirty-two inch and forty-eight inch widths as desired.

SUMMARY OF THE INVENTION

A machine for cutting panels of substantial thickness is provided. The machine comprises upper and lower horizontal parallel shafts. Drive means are provided for rotating each shaft. Each shaft has at least one circular cutting knife. The circular cutting knives of a shaft are oppositely disposed and have overlapping cutting edges. A platform is provided adjacent to the shafts for receiving and feeding panels between the cutting knives. Guide means are carried by the platform for sliding contact with opposite edges of a panel to direct the panel between the shafts for cutting by the knives.

The invention provides a method for cutting large plywood panels into smaller segments. Plywood panels are provided with parallel grooves on one surface which are spaced apart a distance equal to the spacing of standard studding in a wall. In accordance with the method of the invention, the panels are cut along the exact center of the grooves, thus leaving a one-half groove portion on each side edge of the severed panel segments. The panel segments are used in a wall construction which comprises a plurality of vertical support studs each spaced a uniform distance from an adjacent stud. A plurality of the plywood panels are secured to the studs and cover the area defined thereby. Fastening means are driven through the plywood grooves and engage the studs to secure the panels in place. The panels are provided in widths of one, two or three times the distance between a pair of studs. The outer vertical edge of each panel has material defining substantially a one-half groove. This groove material is in abutment with groove material of an adjacent panel to define a full groove in vertical alignment with a stud.

In the drawings:

FIG. 1 is a side elevational view of the cutting machine in accordance with one embodiment of the present invention.

FIG. 2 is a front elevational view of the machine of FIG. 1.

FIG. 3 is a sectional view of a pair of cutting knives of the machine shown in FIG. 2.

FIG. 4 is a view in perspective illustrating the manner of cutting a panel in accordance with the invention.

FIG. 5 is a sectional view of a portion of a plywood panel illustrating the configuration of a groove before cutting of the panel.

FIG. 6 illustrates the panel after cutting in accordance with the present invention.

FIG. 7 illustrates the panel of FIG. 5 after cutting with a saw.

FIG. 8 illustrates the use of a panel in accordance with the present invention in forming a corner of a wall structure.

Figure 9:
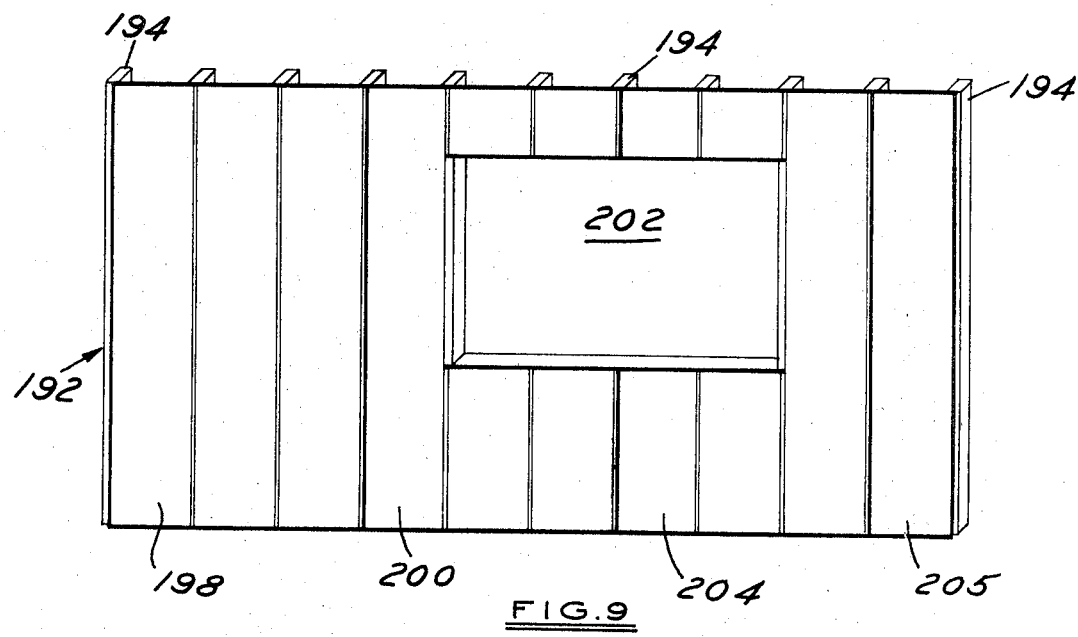
FIG. 9 illustrates a wall construction designed in a conventional manner.

Referring to FIGS. 1, 2 and 3, it will be noted that the cutting machine 10 comprises a central base 12 which has spaced apart side members 14, 16 joined together by horizontal support members 17. Upper and lower horizontal parallel shafts 20, 22 extend between the side members 14, 16. The shafts are suitably journaled in bearing structures 24, 26, 28, 30. Bearing supports 32, 34 are provided on each side member 14, 16. The bearing supports each comprise a pair of spaced apart upstanding members 36, 38 which have guide tongues 40, 42. The bearing structures have grooved sides and are slidably received on the tongues. The lowermost portions of the tongues are enlarged at 44, 46 to provide a stop or rest for the lower bearing structure.

A removable bar 48 extends between the tops of the members 36, 38. A threaded opening is provided centrally of the bar 48. A bolt 54 is threaded through the opening. The bolt 54 has an enlarged head 56 at its outer end for manual turning thereof. The other end of the bolt extends through an opening in the bearing structure 24 and into a cavity 60. An enlarged cap 62 is provided on the lower end of the bolt and is free to turn in the cavity 60. It will be appreciated that the bolt may be threaded into or out of the bar 48 to raise or lower the bearing, and thus the shaft 20, for purposes of adjustment.

An electric gear motor 64 is provided to drive the shafts 20, 22. The motor 64 is mounted on a platform 66, which is hingedly secured at 68 to support structure 70. Bolts 72, 74 extend from the platform 66 to the support structure 70 to permit raising and lowering of the motor to apply the proper tension to a chain 76 connected to the output thereof. The output shaft 78 of the motor carries a sprocket 80 which engages the chain 76. A larger diameter sprocket 82 is provided on the shaft 22 in engagement with the chain. The motor thus directly drives the shaft 22. The other end of the shaft 22 is provided with a gear 84 which engages a gear 86 carried by the shaft 20. The gears 84, 86 are of the same diameter whereby the shafts rotate at the same speed but in different directions.

Each of the shafts carries two pairs of cutting knives 88, 90, 92, 94. The edges of these cutting knives 88, 90, 92, 94 are in position to cut a panel. Additional knives 96, 98, 100, 102 are placed off to one side and held in reserve for use when it is desired to cut a panel into narrower strips. One pair of cutting knives 88, 90 is illustrated in section in FIG. 3. The cutting knives each include a cylindrical blade retainer 104, 106. The blade retainers are provided with a pair of threaded openings 108, 110 which extend radially through a wall thereof. Set screws 112, 114 are received in these openings and engage and hold a key 116 in place. The lower section of key 116 is received in a longitudinally extending keyway 118 provided in the shaft 22. Keyway 118 runs for the length of the shaft. The upper portion of the key is received in a keyway 120 provided on the inner periphery of the retainer. Unthreading of the screws 112, 114 permits longitudinal adjustment of the blade retainer. When the screws are threaded in, the blade retainer is clamped against longitudinal movement and is secured for rotation with the shaft.

An annular knife blade 122, 124 is received in an annular notch 126, 128 provided in the face of each retainer. The blades have an annular enlarged portion 130, 132 which fit into the notches. Peripherally spaced apart openings 134 are provided in the portions 130, 132 to receive bolts 136 which are threading received in threaded openings 138 provided in the retainers to secure the blades in place.

The blades have annular cutting edges 140, 142. One face 144, 146 is flat, while the other face 148, 150 is angled. The blades are preferably spaced apart approximately one-thousandth of an inch and overlap each other approximately three thirty-seconds of an inch. This arrangement permits the blades to receive plywood which is approximately ¼" thick. Somewhat larger or smaller sizes may be cut with this arrangement.

A table 152 is provided at one side of the base 12 for feeding panels between the shafts 21 and 22. The table 152 comprises legs 154 and a platform 156. The platform 156 is supported at one end by the legs 154 and at the other end by an angle member 158 provided on the base 12. A pair of guide members 160, 162 are provided on the platform 156. The guide members are bolted to the paltform and may be adjusted with respect to each other to receive panels of different widths. A similar table 164 is provided on the other side of the base to receive cut panel sections.

The operation of the device may now be understood. When a panel is to be cut, it is placed on the table 152 between the guides 160, 162. The panel is manually forced between the cutting knives. However, once the knives begin to slice the panel, as shown in FIG. 4, the panel is automatically drawn between the knives. FIG. 4 illustrates cutting of a forty-eight inch panel 151 into three segments 153, 155, 157 of sixteen inches each. It will be noted that grooves 166, 168 are provided at sixteen-inch increments on the panel surface. Other grooves are also provided on the panel surface for decorative purposes.

FIG. 3 illustrates the slitting or slicing action of the blades. It will be noted that the panel 165 is cleanly cut with the edges thereof being displaced slightly upwardly or downwardly. The slight displacement of the edges causes an abrasive action against the blade surfaces which results in a sharpening action. As a consequence, the knives may be used for long periods without removal for sharpening.

FIGS. 5, 6 and 7 illustrate the cutting of a panel with the machine of the present invention and the conventional cutting by means of a saw. The panel 170 is provided with a V-groove 172. In FIG. 6 the V-groove 172 has been slit along the line 174. There has been no material lost and the slit is at the exact center of the groove thus leaving a one-half groove portion 176 on one of the segments and a one-half groove portion 178 on the other. As a consequence, when the two sections are secured to a wall, the abutment thereof forms a complete groove. FIG. 7 illustrates the condition when the panel is cut with a saw. One-half 180 of the panel may be provided with the desired one-half groove 182. However, the other half 184 has had the groove portion cut away by the saw, thus resulting in a panel having no groove material at the edge thereof. Such a panel is not suitable for use in a finished wall construction.

FIG. 8 illustrates one advantageous use of the embodiment of the present invention. In FIG. 8, a pair of panel sections 186, 188 are located at right angles to form a corner. The panel selected is of a grained nature. It will be noted that the use of panels cut by the method of the present invention results in the abutting edges forming a complete groove 190. As a consequence, the original panel sections may be used in forming the corner with the result that the grain pattern is continuous. If two different panel sections have to be used, the grain would be discontinuous and thus be visually objectionable. It will be noted that the panels are secured in place by vertically spaced nails 191 which are driven through the groove 190 into engagement with a stud 193.

Figure 10:
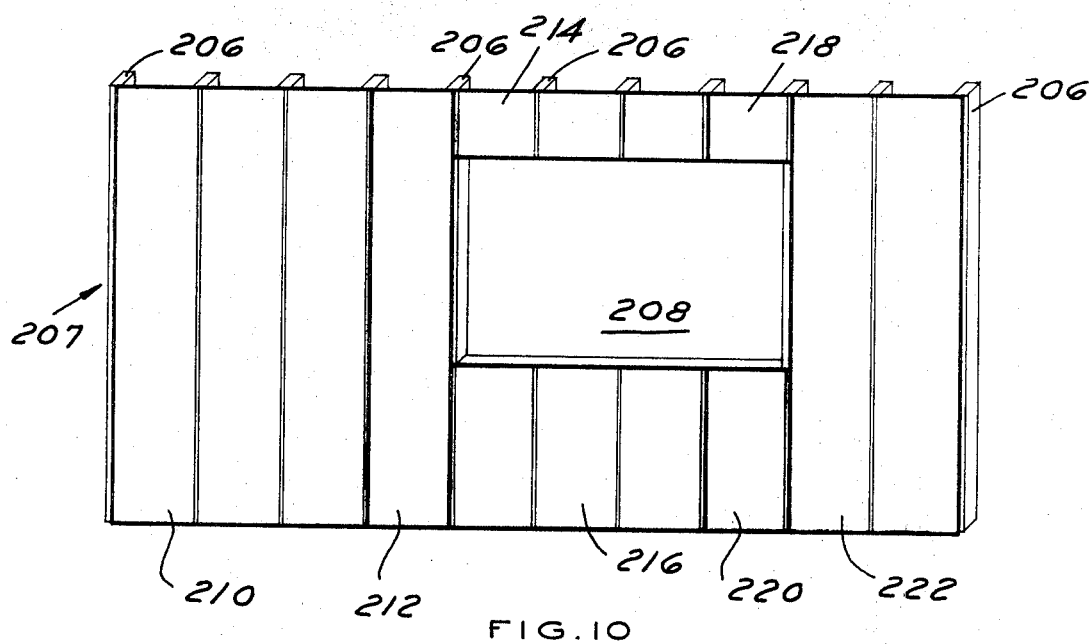
FIG. 10 illustrates a wall construction designed in accordance with the present invention.

FIGS. 9 and 10 illustrate a wall construction designed in accordance with the present invention. Referring to FIG. 9, it will be noted that the wall construction 192 includes a plurality of wooden vertical support studs 194. Studs 194 are spaced a uniform distance apart. The conventional practice is to space the studs a distance of sixteen inches apart.

A plurality of plywood panels (outlined in heavy lines) are secured to the studs and cover the area defined thereby. The panels are secured to the studs by driving nails through the grooves into the material of the studs. Each of the panels is of the conventional forty-eight inch width. One panel 198 is used in its entirety. The adjacent panel 200 overlaps a window opening 202 and consequently has a section cut out of its center. The third panel 204 also overlaps the window opening 202 and has a section cut out to accommodate the opening. A fourth panel 205 is provided which is sixteen inches wide to cover the last studs. It will be appreciated that in the FIG. 9 showing the material cut out of panels 200, 204 and the large panel from which the panel 205 was cut represent waste material which is thrown away.

In the embodiment of FIG. 10, a wall construction 207 designed in accordance with the present invention is illustrated. The same number of studs 206 are illustrated and a window opening 208 of the same size and position is shown. The first panel 210 is of the conventional forty-eight inch width, the second panel 212 is of the sixteen inch width, being one segment of a forty-eight inch panel. The panel 212 is in alignment with the frame stud with which the left-hand edge of the window opening is aligned. The third panel 214 is provided above the window opening. The panel 214 is forty-eight inches wide but is cut to the necessary size of the area above the window. Below the window the fourth panel 216 of forty-eight inch width is provided. A panel 218 of sixteen inch width is provided above the window adjacent to the panel 214 while a panel 220 of sixteen inch width is provided beneath the window adjacent to panel 216. Finally, a panel 222 of thirty-two inch width is provided on the right-hand side of the window opening to complete the wall structure. It will be noted that in the FIG. 10 embodiment, there is no wasted paneling. Contrariwise, in the FIG. 9 embodiment, the wasted material equals the area of the window opening, plus one full length sixteen-inch panel segment.

It may happen that an aperture opening overlaps a stud in some wall designs. In such a case, it will be necessary to cut a section out of a panel to accommodate the aperture and this will be waste. However, in no case should a section equal to sixteen inches be cut out. In such an instance, panels similar to the panels 214, 218, 216, 222 should be used. For example, panels 212, 214, 216 could have formed a single thirty-two inch section with a notch cut out to accommodate the window opening. There would then have been waste material which has been avoided by the present design.

What I claim as my invention is:

1. A machine for converting commercial grooved plywood panels into smaller segments of narrower widths without loss of material occasioned by sawing which comprises a platform adapted to receive wide plywood stock having on one side a series of laterally spaced longitudinally extending grooves dividing said stock into panels of equal width, upper and lower horizontal parallel shafts, drive means for rotating each shaft, each shaft having at least one circular cutting knife, said circular cutting knives being oppositely disposed and having overlapping cutting edges, said platform being adjacent to the shaft for receiving and feeding panels between the cutting knives, guide means carried by the platform for sliding contact with opposite edges of a panel to direct the panel between the shafts for cutting by the knives, each circular cutting knife comprising a cylindrical retainer member having a central opening for reception on the shaft, an annular knife blade detachably secured to the retainer member, means releasably locking the retainer member including a longitudinally extending slot in the outer periphery of the shaft, a longitudinal slot on the inner periphery of the retainer member, a key received in said slots to lock the retainer member for rotation with the shaft, means releasably clamping the key to prevent longitudinal movement of the retainer member along the shaft, and further characterized in that opposing circular cutting knives on the two shafts are spaced longitudinally apart approximately one-thousandth of an inch and overlap approximately three thirty-seconds of an inch.

2. A machine as defined in claim 1 and further characterized in that a plurality of additional pairs of oppositely disposed circular cutting knives are located outside of the guide means so as not to act upon panels passing through the guide means and through the shaft, said additional cutting knives being movable to positions within the guide means to provide for cutting the panels into different widths, said guide means being adjustable for guiding panels of various widths.

3. A machine as defined in claim 1 and further characterized in that said drive means comprises a prime mover connected to one of the shafts for direct drive thereof, and gear means operatively connected between the shafts to drive the other shaft from said one shaft, said gear means being adapted to rotate said other shaft in the opposite direction of rotation of said one shaft and further characterized in the provision of means at each end of the upper shaft for adjusting said shaft upwardly or downwardly.

4. A machine as defined in claim 1 and further characterized in the provision of a support structure at each end of the shafts, a bearing structure for each end of said shafts carried in said support structures, the bearing structures for the upper shaft being movable in the support structures to adjust the height of the upper shaft, and means releasably locking the bearing structures in the support structures, said locking means being disengageable to permit entire removal of the bearing structures and attached shafts from the support structures.

5. A machine as defined in claim 4 and further characterized in that said support structures each comprise a pair of upstanding spaced apart support elements defining a space therebetween for the bearing structures, oppositely disposed tongues on said upstanding support elements, said bearing structures including grooves slidably received on said tongues and further characterized in the provision of a detachable support bar extending between the upper ends of said support elements, and adjusting means extending through said support bar into engagement with the upper bearing structure, said adjusting means being movable vertically for vertical adjustment of the upper being structure.

References Cited

UNITED STATES PATENTS

| | | | |
|---|---|---|---|
| 190,987 | 5/1877 | Starr | 83—498 X |
| 611,599 | 10/1898 | Beaty et al. | 83—500 X |
| 672,899 | 4/1901 | Haasch | 83—502 X |
| 824,694 | 6/1906 | Irwin | 83—449 |
| 2,307,452 | 1/1943 | Cohen | 83—503 X |
| 2,393,845 | 1/1946 | Wagner et al. | 83—498 X |
| 2,888,076 | 5/1959 | Lanstrom | 83—665 |

JAMES M. MEISTER, Primary Examiner

U.S. Cl. X.R.

83—430, 471, 498, 503, 665